Patented Feb. 19, 1935

1,991,393

UNITED STATES PATENT OFFICE 1,991,393

PROTECTIVE COMPOSITION AND METHOD OF MAKING SAME

William W. Joyce, Chicago, Ill., assignor to Al-Oys Incorporated, Chicago, Ill., a corporation of Illinois No Drawing. Application November 2, 1931, Serial No. 572,736

11 Claims. (Cl. 134—1)

This invention relates to a composition material for use in surfacing roads, roofs, pipe lines and the like and as a joint filler.

Various preparations comprising tar, asphalt and other bituminous materials are used for such purposes but in general it is necessary that these materials be melted and applied while hot. It is also known to prepare asphalt emulsions for application while cold.

I have now found that if vermiculite be incorporated into an emulsion of such materials, provided a suitable dispersing agent be used, the preparation may be applied cold and has the ability to harden into a solid layer.

It is, then, an object of my invention to provide a bituminous protective composition which may be applied while cold.

It is a further object of my invention to provide a bituminous preparation which will harden to form a waterproof coating on surfaces to which it is applied.

It is a further object of my invention to provide a bituminous surfacing material having greater toughness, plasticity, body and stiffness than ordinary asphalt coatings.

It is a further object of my invention to provide a coating material having sound absorbing qualities.

It is a further object of my invention to provide a process by which an asphalt composition, with improved properties, may be produced.

Other and further objects of my invention will be apparent from the following specification and the appended claims.

As as starting material, I employ an emulsion comprising any bituminous material, such as asphalt, emulsified with water by means of any suitable emulsifying agent in a manner well known to the art. I have found that when a mineral material such as vermiculite is added to such an emulsion, the emulsion breaks down very quickly, producing a hard layer of the asphalt or other bituminous material. However, if the vermiculite be first moistened with water, alcohol or some other suitable liquid, it can then be added to the emulsion without breaking it down and causing the asphalt to be precipitated. This emulsion of asphalt containing vermiculite may then be used for any surfacing, finishing, or waterproofing operation for which asphalt or similar products are adapted.

The preparation will remain as an emulsion until it is applied to the surface to be treated, and then the emulsion gradually breaks down and the asphalt and vermiculite form a hard, moisture-proof coating over the treated surface.

I prefer that the vermiculite be previously treated by heating to a temperature of 2000° F. or more. This high temperature causes the vermiculite to exfoliate. The resulting exfoliated vermiculite has much greater volume than the original material and is lighter and more porous. It is this light, porous, exfoliated vermiculite which I prefer to use in my composition.

I prefer that the vermiculite be ground to sufficient fineness to pass through a 20 to 30 mesh screen and that it be moistened with about 13% water or alcohol by volume just before mixing with the asphalt. I prefer that my completed preparation be about 45% of the vermiculite moistened with water or alcohol and about 55% of asphalt.

However, I do not desire to be limited to any specific proportion for my various ingredients since these proportions may be varied somewhat. For example, the proportion of water or alcohol to my vermiculite may vary between 5 and 50%. The proportion of this mixture in my finished product may vary between 20 and 80% while the asphalt may vary between the same limits. Also, various bituminous products may be used besides asphalt.

When desired, aggregates such as sand, gravel, fiber and other filling materials may be incorporated into my composition to adapt it to special uses.

In addition to the advantages that this material may be applied cold, I have found that the vermiculite imparts superior properties to the finished surface so that my preparation is not only more desirable than plain asphalt by reason of its being easier to apply, but it produces a superior result as well. The vermiculite gives the finished coating various desirable properties such as increased toughness, less brittleness, higher flow point, increased heat insulation, increased resistance to acids and alkalis, increased body, stiffness and plasticity. Its ability to absorb sound is also increased.

It will be understood that a wide variety of bituminous products may be used to make the emulsion which I use as a starting point to make my preparation.

It will be understood that while I have specified exfoliated vermiculite as my preferred mineral material, there are other substances which are very similar to vermiculite and for the purpose of my invention fully equivalent thereto such as jefferisite, zonolite, biotite, etc., and where the word vermiculite occurs in the appended claims, I mean it to include these equivalent materials.

Thus it will be seen that I have provided a bituminous preparation which may be applied to a surface when cold, and which will form a hard, waterproof coating of bituminous material over said surface.

I am aware that numerous details of the process may be varied through a wide range without departing from the principles of this invention, and I therefore do not propose limiting the patent granted hereon otherwise than necessitated by the prior art.

I claim as my invention:

1. A bituminous preparation having superior resistance to acids and alkalis, heat insulating and sound absorbing qualities, increased body, flow point, and plasticity, said composition comprising vermiculite, asphalt, water and an emulsifying agent said preparation being in the form of an emulsion.

2. A bituminous preparation having superior heat insulating and sound absorbing qualities, said preparation comprising asphalt, water, alcohol, vermiculite and an emulsifying agent, said preparation being in the form of an emulsion.

3. A bituminous coating preparation containing 20 to 80% of a mixture of 5 to 50% alcohol and 95 to 50% vermiculite, and 80 to 20% of an emulsion of a bituminous material, said preparation being superior to ordinary bituminous emulsions in heat insulating and sound absorbing qualities, resistance to acids and alkalis, body, and plasticity.

4. A bituminous coating preparation containing 20 to 80% of a mixture of 5 to 50% alcohol and 95 to 50% vermiculite, and 80 to 20% of an emulsion comprising asphalt, water and an emulsifying agent, said preparation being superior to ordinary bituminous emulsions in heat insulating and sound absorbing qualities, resistance to acids and alkalis, body, and plasticity.

5. A bituminous coating preparation containing 20 to 80% of a mixture of 5 to 50% water and 95 to 50% vermiculite, and 80 to 20% of an emulsion of a bituminous material, said preparation being superior to ordinary bituminous emulsions in heat insulating and sound absorbing qualities, resistance to acids and alkalis, body, and plasticity.

6. A bituminous coating preparation containing 20 to 80% of a mixture of 5 to 50% water and 95 to 50% vermiculite, and 80 to 20% of an emulsion comprising water, asphalt and an emulsifying agent, said preparation being superior to ordinary bituminous emulsions in heat insulating and sound absorbing qualities, resistance to acids and alkalis, body, and plasticity.

7. A bituminous composition comprising about 45% of vermiculite moistened with water and about 55% of an aqueous asphalt emulsion, said preparation being easier to apply than ordinary asphalt emulsion.

8. A bituminous emulsion comprising about 45% of a mixture of about 13% water and 87% exfoliated vermiculite, and 55% of an aqueous emulsion asphalt, said preparation being adapted for application while cold.

9. A bituminous emulsion consisting of vermiculite, asphalt, water and an emulsifying agent.

10. A bituminous coating preparation consisting of 20 to 80% of a mixture of 5 to 50% water and 95 to 50% vermiculite, and 80 to 20% of an emulsion of a bituminous material.

11. A bituminous emulsion consisting of about 45% of vermiculite moistened with water and about 55% of an aqeous asphalt emulsion.

WILLIAM W. JOYCE.